Figure 1:
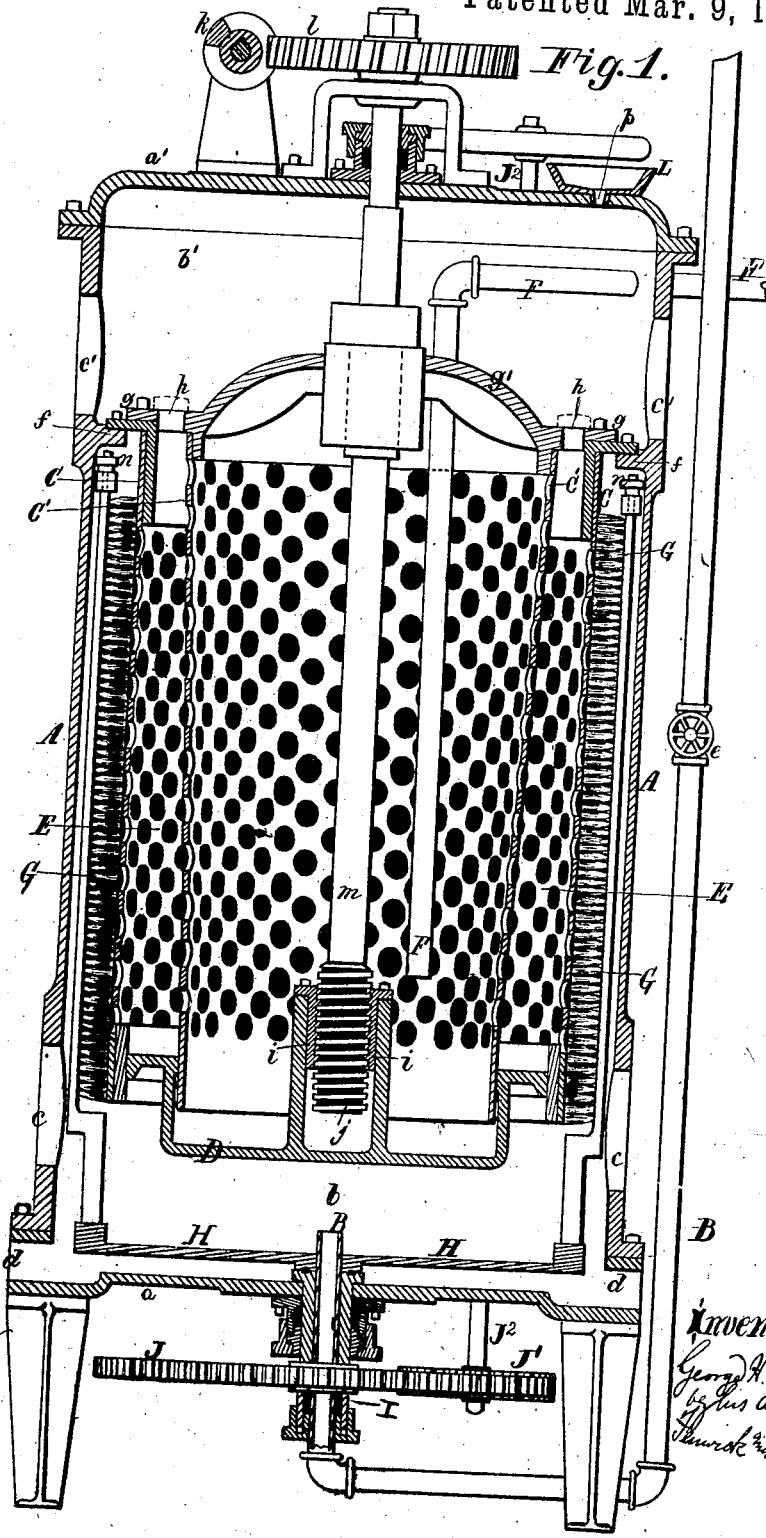

(No Model.)

G. H. MOORE.
METHOD OF CLEANSING FILTERS.

No. 337,423.  Patented Mar. 9, 1886.

3 Sheets—Sheet 1.

Witnesses:
B. C. Fenwick
Robt. L. Fenwick

Inventor:
George H. Moore
by his attys
Fenwick & Fenwick

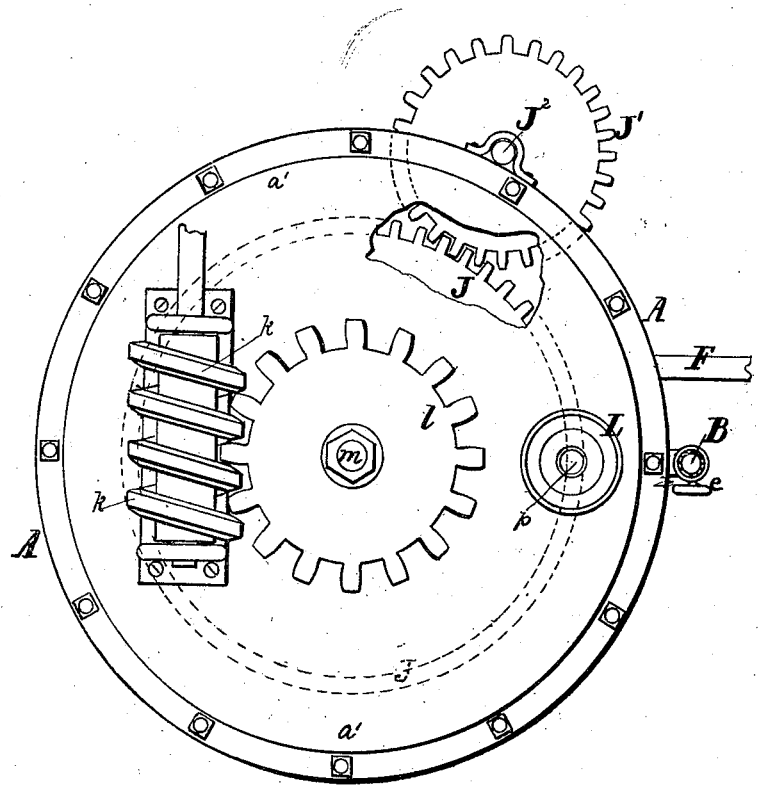

(No Model.)
G. H. MOORE.
METHOD OF CLEANSING FILTERS.
No. 337,423. Patented Mar. 9, 1886.
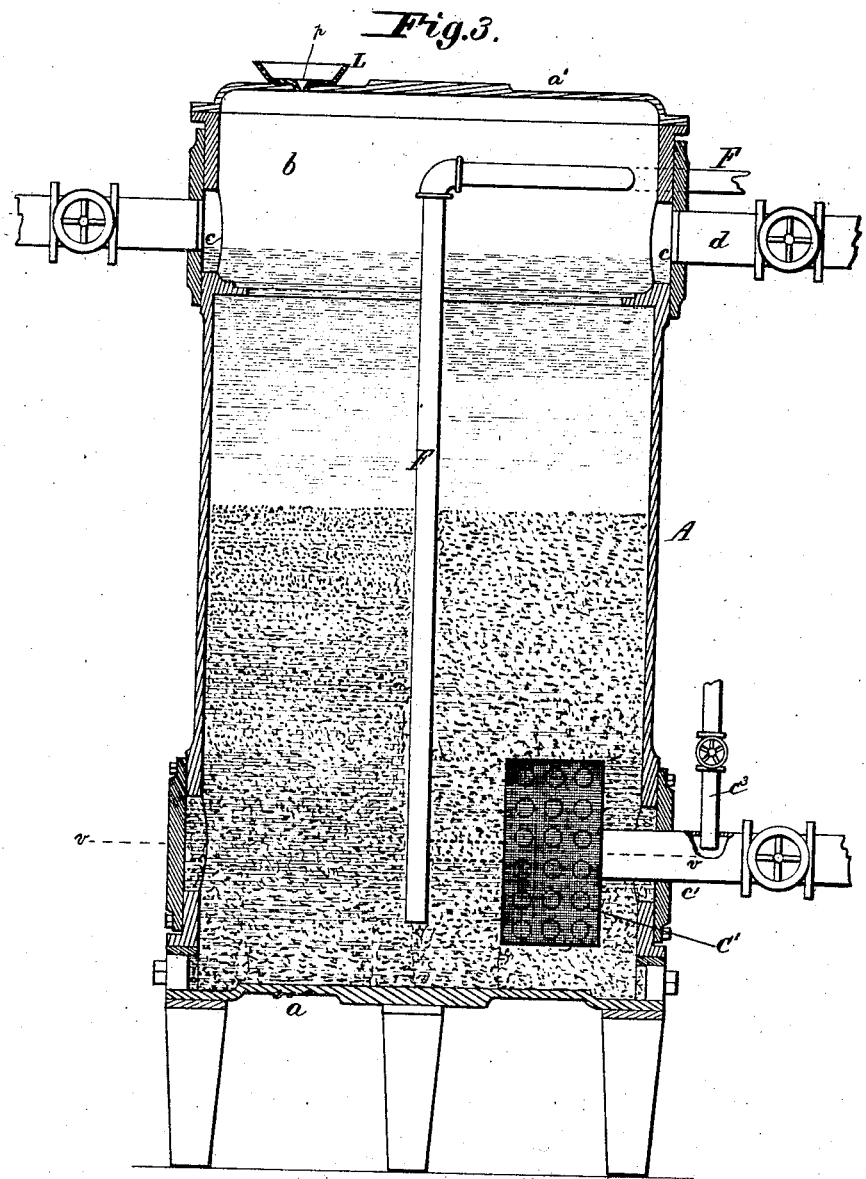
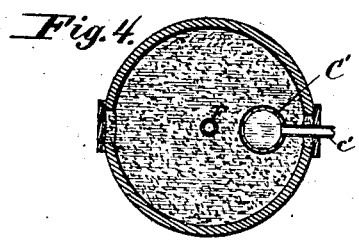
Witnesses:
B. C. Fenwick
Robt. L. Fenwick
Inventor:
George H. Moore
by Fenwick and Lawrence
His Attorneys

UNITED STATES PATENT OFFICE.

GEORGE H. MOORE, OF NORWICH, CONNECTICUT.

METHOD OF CLEANSING FILTERS.

SPECIFICATION forming part of Letters Patent No. 337,423, dated March 9, 1886.

Application filed August 14, 1883. Serial No. 103,706. (No model.)

*To all whom it may concern:*

Be it known that I, GEORGE H. MOORE, a citizen of the United States, residing in Norwich, in the county of New London and State of Connecticut, have invented certain new and useful Improvements in the Methods of Cleansing Filtering Material in its Filtering Position, of which the following, in connection with the accompanying drawings, is a specification.

This invention relates to the art of filtration, and its object is to remove from filtering material contained within an apparatus for filtering liquids, any solid matter separated from a liquid by means of said filtering material and apparatus. The method herein claimed consists in the manner in which the filtering material is treated in position for the purpose herein specified, and the apparatus herein shown and described being of a suitable construction and arrangement in which to employ and illustrate the method claimed.

The invention consists in the method of cleansing the filtering material, and also of destroying any germs contained therein, as will be hereinafter described, and specified in the claims.

In the accompanying drawings, Figure 1 is a vertical sectional view of my improved apparatus, which illustrates my improved method of treating the filtering material in position for the purpose of cleansing it, and also shows a novel construction for containing the mass of loose filtering material used. Fig. 2 is a broken top view of the apparatus with the hand-wheel removed. Fig. 3 is a vertical sectional view of a modified form of construction of the hereinbefore-mentioned apparatus, designed to illustrate my improved method of treating the filtering material in position and any impurities deposited therein; and Fig. 4 is a view in cross-section on line $v$ of Fig. 3.

A in the views of the drawings designates an outer inclosing-vessel, of a cylindrical or other suitable form, closed at top and bottom by heads $a$ and $a'$. This vessel is made to constitute a lower unfiltered-water compartment, $b$, and an upper filtered-water compartment, $b'$, when it is desired that the filtration shall be upward, and when the apparatus is complete and ready for operation as a filtering apparatus. The compartment $b$ is provided with a water-supply inlet, $c$, and in the compartment $b'$ an outlet, $c'$, is provided. Said inlet and outlet are to connect with pipes having suitable regulating-valves. The apparatus is also provided with suitable waste-outlets. The vessel A is also provided with a pipe, B, having a valve, $e$, and leading from the compartment $b$. Said pipe, being purposely of small diameter, is used when the filtration is upward to relieve the interior of the apparatus from pressure by opening the valve $e$ when the filtering material is being treated as herein described. When the filtration is downward in this apparatus, it is used as a pipe, through which steam is admitted to the interior of this apparatus, as hereinafter described.

Within the vessel A that part of the apparatus used for containing filtering material and for regulating the density of the same is suspended upon an interior flange, $f$, and it comprises an outer perforated cylinder, C, and an inner perforated inverted-cone frustum, C'. The cylinder C and cone C' are fastened to the annular ring $g$ of the spider $g'$, as shown. The ring $g$ is provided with a number of filling-openings, $h$, closed by plugs. (Shown by dotted lines.) At the lower ends of the cylinder C and cone C' a flanged and recessed bottom is arranged to move up and down between the cylinder C and cone C', and thus close the chamber between said cylinder and cone, and also close the lower end of the cone C'. The cylinder and cone, together with the ring $g$ and bottom D, form a downwardly-flared annular chamber, E, for containing the filtering material consisting of any granular substance, preferably crushed quartz, of suitable fineness. The bottom D is made adjustable up and down by means of the screw-and-nut device $i j$, applied within the hollow hub of the bottom D, and operated by means of the worm-and-gear device $k$ $l$, the two devices being connected by means of the shaft $m$, passed down through a proper stuffing-box of the apparatus and through the hub of the spider $g$, as shown, or in any other suitable manner.

Into the vessel A the steam-pipe F is passed and extended down near the bottom level of the unfiltered-water compartment $b$. This pipe occupies a position within the inverted truncated cone C', and its end terminates above the bottom D and at the lower portion of the filtering material, as shown.

In the top head of the vessel A an opening, p, is formed for the introduction of a chemical substance, such as soda-ash, lime, or acids, and the like into the body of water in which the filtering material is immersed. Around this opening a suitable hopper, L, is formed.

The perforated cylinder C and cone C' are covered on their outer surfaces with wire-cloth of a proper fineness. The downwardly-flared chamber E is filled through the openings h with the filtering material, and the compactness or density of the same is regulated by the bottom D being raised or lowered.

The filtration may be either upward or downward through the apparatus, as desired. If the filtration is upward, water to be filtered is supplied at the inlet c, and it rises in the vessel A on the outside of the cylinder C, passes through the wire-cloth-covered perforations of said cylinder, then through the interstices between the grains of filtering material, and, being thus separated from suspended matter, passes through the wire-cloth-covered perforations of the inverted-cone frustum C' into the chamber or reservoir formed and encircled by said cone, and from thence escapes in a highly mechanically-purified state into the filtered-water compartment b', and passes off through the outlet c' ready for use.

If, instead of filtering upward through the apparatus, as hereinbefore described, it is desired that the filtration should be downward, then the water to be filtered is supplied through the filtered-water outlet c', which is now used as an inlet, from whence it passes into the apparatus, filling the reservoir formed and encircled by the cone C' and the filtered-water compartment b', and then passes through the wire-cloth-covered perforations of the cone C', through the interstices between the grains of filtering material, and, being thus separated from suspended matter, passes through the wire-cloth-covered perforations of the cylinder C into the compartments b of the vessel A, and from thence passes off in a highly mechanically-purified state through the inlet c, which in this case is used as an outlet.

When the filtering material requires cleansing, it is released from compression by lowering the bottom D, to allow the grains to be moved by the united action of steam and water. After the filtering material is cleansed in position, the bottom D is again caused to compress the mass of filtering material in chamber E before water to be filtered is again admitted into the apparatus.

A modified form of construction, as shown in Fig. 3, of the hereinbefore-described apparatus is hereinafter described to further illustrate and set forth my method of treating the filtering material in position and any impurities deposited upon or among the same by the operations of filtration. This modified form of construction is obtained as follows: The cylinder C, cone C', spider g, bottom D, screw-and-nut device i j, worm-and-gear device k l, shaft m, brushes G, revolving bottom plate, H, revolving hollow shaft I and its stuffing-boxes, spur-wheel J, pinion J', hand-wheel shaft J², and pipe B are all removed from the apparatus, leaving inside the case A only the filtering material and the steam-pipe F, and then substituting for the conical filtered-water reservoir which communicated with a filtered-water outlet, a cylindrical filtered-water reservoir which communicates with the filtered-water outlet near the bottom of the case A, instead of near its top, for reasons hereinafter set forth. In this modified form of construction the filtration may be upward or downward. When the filtration is to be downward, liquid to be filtered is admitted through pipe C' into the case A near its top, filling the space therein above the filtering material, and it filters downward through the contained mass of filtering material to the filtered-water reservoir, flowing into it through its wire-cloth-covered perforations, and from thence through the filtered-water pipe out and away from the apparatus, the impurities contained in the liquid operated upon being deposited upon and near the top surface of the filtering material.

When it becomes necessary to cleanse the filtering material, the herein described apparatus is prepared as follows: The flow of unfiltered liquid into the apparatus and the flow of the filtrate out therefrom is shut off, leaving the interior of the apparatus not otherwise occupied filled with the liquid that has flowed therein through the unfiltered-liquid inlet and in which the filtering material is immersed. Then a waste-outlet is opened, to allow a portion of the immersing-liquid to flow out from the apparatus, thereby causing a vacancy in the same, as shown in Fig. 3.

The required manipulations of the apparatus to prepare the same before the cleansing of the filtering material being completed, the following described method is employed to cleanse the filtering material in position.

In the first-described form of apparatus, when the filtration is upward steam is admitted through pipe F, and issues therefrom at its terminus, which is near the bottom level of the immersed filtering material, thereby heating first the immersing-liquid and the filtering material nearest to the issuing steam, the effect of which upon said liquid and material is hereinafter more particularly described. As the immersing liquid becomes heated, the valve e in pipe B is slightly opened, and it is obvious that then the heated immersing-liquid will press outwardly from the reservoir formed and encircled by the cone C' through the interstices of the grains of the filtering material contained in the chamber E, moving said grains, and out through the wire-cloth-covered perforations of the cylinder C into the compartment b of the case A, carrying with it any impurities that have deposited upon the filtering-surface or in said interstices. After the immersing-liquid has become heated, preferably to 212° Fahrenheit, then a waste-outlet, d, is opened to allow of a quick escape from the apparatus of the heated immersing-liquid and impurities, and at the same time admitting into the apparatus, near its top, a stream of cold liquid for the purpose hereinbefore stated. It is obvious that the immersing-liquid begins to circulate within the apparatus as it is heated, and that the grains of filtering material are moved as described.

When the filtration is downward in this first described form of apparatus, it is obvious that the deposited impurities must be discharged therefrom through a waste-outlet located above the top level of the filtering material, consequently at or near the top of the apparatus. Therefore steam is admitted into the apparatus preferably through pipe B, issuing therefrom into the immersing-liquid in compartment b, heating the same, and causing it to press inwardly from said compartment, through the wire cloth-covered perforations of the cylinder C, through the interstices between the grains of loose filtering material contained in the chamber E, moving said grains, and through the wire cloth-covered perforations of the cone C' into the reservoir formed and encircled by said cone, carrying with it any impurities that have been deposited upon the filtering-surface or in said interstices. Then a stream of cold liquid is admitted into the apparatus, which displaces therefrom the said heated immersing-liquid and impurities, which pass out from the apparatus through an open waste-outlet located as hereinbefore stated. It is obvious that the portion of the immersing-liquid first heated rises, and the colder portion of the same sinks to become heated and rise, and it is thus caused to circulate within the apparatus so long as steam is admitted therein or until displaced by a stream of cold liquid, as described.

In the modified form of construction herein described in cleansing, steam is admitted through a pipe, C³, issuing therefrom at its terminus. (Shown in Fig. 3.) The effect of the steam issuing as herein stated is now more particularly described.

It is obvious that the instant steam issues from the terminus of the conveying-pipe it will expand among the immersed filtering material by reason of its well-known expansive force. It is also obvious that almost at the instant it issues from said orifice or orifices it will be condensed—i. e., contracted—for the reason that it comes in contact with the colder immersing-liquid and filtering material; but it is evident that as the immersing-liquid and filtering material become gradually heated by reason of the condensing of the entering steam, its expansive force will as gradually be diffused among the immersing-liquid and filtering material by reason of the same becoming heated until it becomes practically effective throughout the same. The heating first of the lower portion of the immersing-liquid causes it gradually to rise up between the interstices of the grains of the filtering material, and as it rises the colder portion of the immersing-liquid sinks, by reason of its greater specific gravity, until it comes in contact with the entering steam, when, in like manner, it becomes heated and rises, this operation continuing so long as the steam is permitted to enter—preferably until the immersing-liquid has become heated to about 212° Fahrenheit—thus obtaining a circulation of the immersing-liquid which is confined to within the apparatus and throughout the mass of uncompressed or loose filtering material.

The effect of the expansive force of the steam exerted, as described, upon the immersed filtering material is to gradually agitate the same, causing friction between the grains of filtering material, loosening the impurities therefrom and ejecting them into that portion of the immersing-liquid which is above the top level of the filtering material. Impurities of a slimy nature are thus readily separated from the filtering material. It is also obvious that as the heat of the immersing-liquid and filtering material increases the agitation of the filtering material and the circulation of the immersing-liquid is also increased until the maximum desired temperature of the same—viz., 212° Fahrenheit—is reached, when the said agitation will be the greatest and the described circulation the most rapid. At this stage of the method of cleansing steam will issue from the open waste-outlet of the apparatus, which is an indication that the impurities have been separated from the filtering material and can now be easily ejected from the apparatus. A stream of cold liquid is now admitted into the apparatus, which, by reason of its greater specific gravity, displaces the heated immersing-liquid and impurities, causing them to flow first out from the apparatus. When water filtered through a mass of filtering material is used for domestic purposes—especially as drinking-water—a single fact will serve to show the value and importance of the herein-described method of cleansing filtering material in position.

It is well known that certain small bodies called "germs" are, some of them, the cause of disease when introduced into the human body, and that these germs are associated with the particles of organic matter suspended in water, and which are separated from it when it is passed through filtering material, the germs remaining among the filtering material. Further, it is asserted they can only practically be destroyed by boiling, and in some cases only by prolonged boiling. Therefore it is obvious that a mass of filtering material contained within a filter and used for the purpose of filtering drinking-water must quickly become permeated with these germs, which soon cause it to be unfit for use as designed, and a means of polluting instead of purifying the water filtered through it.

The method of treating the chemical substance of either an acid or alkaline nature introduced within the apparatus is as follows: Said substance is preferably introduced into the hereinbefore-described immersing-liquid, and then steam is admitted among the same for the purpose of heating the immersing-liquid and chemical substance and effecting a combination between them, and to cause said combination to circulate among the loose filtering material in the manner herein described, that it may combine with any matter having an affinity therefor which has been separated by means of the filtering material contained within the apparatus from the liquid operated upon, and afterward displacing the same from the apparatus by introducing therein a stream of cold liquid.

The above-described method of treating a chemical substance will be made the subject of another application for a patent.

In the first herein described form of apparatus, when the bottom D is lowered the filtering material is released from compression, and said lowering also enlarges the chamber containing the filtering material, thus forming a chamber for the purpose stated which is not filled with filtering material, and in which the grains of filtering material contained therein can be agitated or moved in the manner and for the purpose herein described.

In the modified form of construction herein described it is obvious that the filtering material is released from compression by shutting off the inlet of the apparatus and opening an outlet, and that the chamber or receptacle for containing filtering material is not filled with filtering material. It is also obvious that the filtering-passages are the interstices between the grains of filtering material contained within the apparatus, and that when said grains are agitated or moved in the herein described method of cleansing, said filtering-passages are re-formed, and that this re-forming occurs whenever the filtering material is cleansed as herein described.

It is evident that the cleansing of the filtering material is effected by means of steam affecting the filtering material, the immersing-liquid, and the solid matter separated from the liquid filtered, as herein described, and that said immersing-liquid and ejected deposited matter will flow out and away from the apparatus through a waste-outlet located at the top level of the filtering material without the aid of a stream of cold liquid, and more rapidly if steam is permitted to enter into the apparatus while the immersing-liquid and deposited matter are flowing out, as above stated; but I prefer a stream of cold liquid for the purpose of displacement, as herein described.

Having thus described my invention, I claim—

1. The herein-described method of cleansing filtering material in position, by means of steam introduced within the apparatus for the purpose of agitating a mass of immersed, movable, loose filtering material in position therein, at the same time re-forming the filtering-passages thereof, and causing the immersing-liquid to circulate within the apparatus, and ejecting from the filtering material any deposited matter into the immersing-liquid, which, with the contained deposited matter, flows out from the apparatus through a waste-outlet, all substantially as and for the purpose herein described.

2. The method of cleansing filtering material while in position within the filtering apparatus, consisting in heating and agitating the filtering material and the liquid in which it is immersed, and then introducing within the apparatus a stream of cold liquid, thereby displacing the heated immersing-liquid and any deposited matter contained therein, and causing the same to flow out and away from the filtering apparatus through a waste-outlet, substantially as set forth.

GEORGE H. MOORE.

Witnesses:
ROBT. L. FENWICK,
B. C. FENWICK.